Aug. 9, 1949.  L. A. PAYNE  2,478,310
ARBOR MOUNTING MEANS
Filed July 16, 1945

INVENTOR.
LAWRENCE A. PAYNE
BY
Cook & Robinson
ATTORNEYS

Patented Aug. 9, 1949

2,478,310

UNITED STATES PATENT OFFICE 2,478,310

ARBOR MOUNTING MEANS

Lawrence A. Payne, Seattle, Wash.

Application July 16, 1945, Serial No. 605,361

3 Claims. (Cl. 82—4)

This invention relates to spindle or arbor mounting means and it has reference more particularly to the provision of improved means for the centering and mounting of a spindle shaft or arbor in the end of a pipe so that it may serve as a support and axle for various tools such for example, a cutter used to smooth a flange that may be formed at the end of the pipe, or a tool for reaming out the end of the pipe.

It is the principal object of this invention to provide means whereby a spindle shaft or arbor may be mounted and accurately centered in the end portion of a tube or pipe for use as a tool carrier or for any other use to which such a spindle or arbor might be employed.

It is also an object of this invention to provide a device of the kind above recited, that may be adjusted readily to adapt it to pipes or tubes of different diameters within certain limits.

Still another object of the invention is to provide means for adjusting the device for securement in position after it has been located within the end portion of the tube or pipe.

Still further objects of the invention reside in the improved details of construction and combination of its parts and in the use of the device as hereinafter described.

In accomplishing the above and other objects of the invention, I have provided the improved details of construction, the preferred forms of which are illustrated in the accompanying drawings wherein—

Referring more in detail to the drawings—

1 designates the arbor, or spindle shaft and 2 designates an elbow section of pipe within which the arbor is mounted in accordance with the objects of the present invention. The pipe 2 is here shown as having a straight cylindrical portion adjacent its open end and formed at the end with an extending flange 3.

In the mounting of such a spindle shaft or arbor 1 in a pipe as is often done for various uses, such for example for mounting a tool for the smoothing of the end flange, it is necessary that the arbor be accurately centered in the pipe and that it be rigidly and securely mounted for rotation therein. Due to slight variation in diameter of such pipes, it is difficult to provide a mounting that can be universally applied. Therefore it becomes necessary that means be provided to compensate for the slight variations that occur in diameter and also to correct the position of the arbor in order that it may coincide exactly with the axial line of the pipe.

Figure 1:
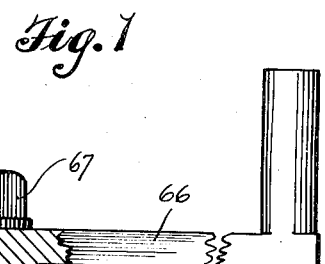
Fig. 1 is a longitudinal section of the present arbor or spindle mounting mechanism as applied to the end of a flanged pipe and illustrating the mounting of a flange smoothing tool by means of the arbor.
Figure 3:
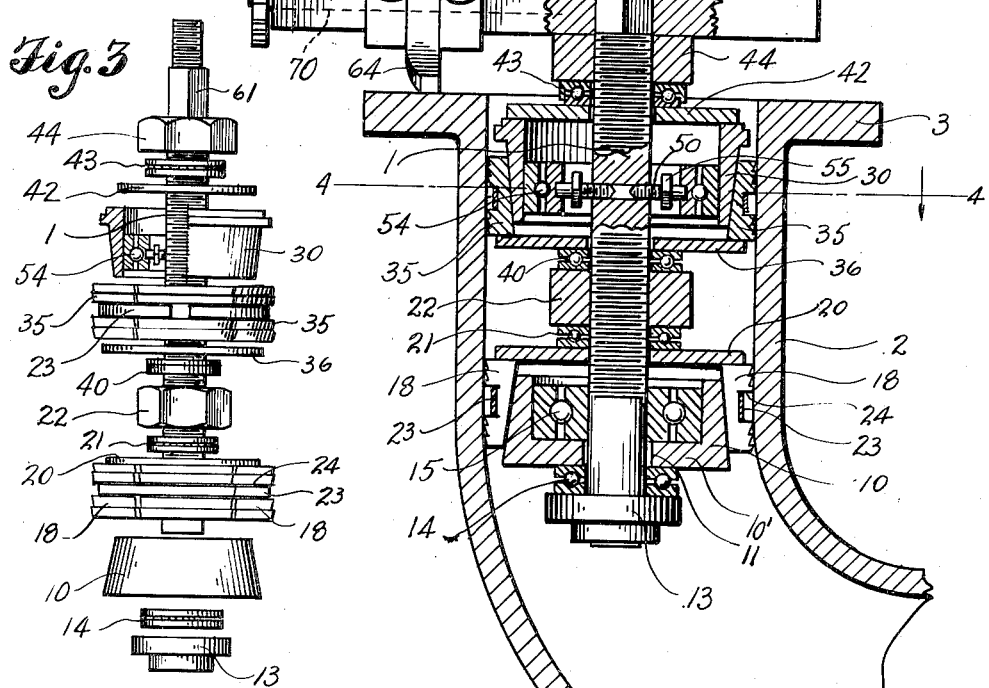
Fig. 3 is a side view of the spindle and its mounting means shown in dis-assembled relationship for better understanding.
Figure 4:
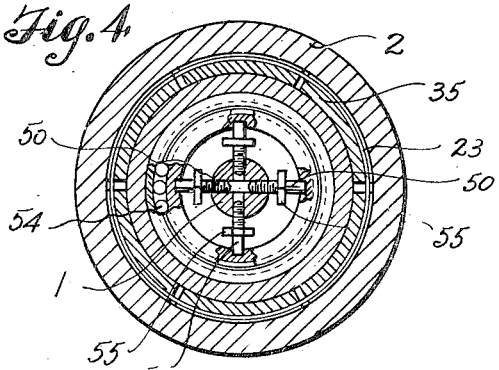
Fig. 4 is a cross sectional view taken on the line 4—4 in Fig. 1.

To mount the spindle shaft of the present device, there is provided inner and outer end supporting bearings therefor. The inner end bearing comprises a bearing cup 10 formed with a flat bottom wall 10' in which is formed a center opening 11 through which the lower end portion of the spindle shaft 1 extends. Fixed to the lower end of the shaft is a nut or head 13 and supported by this head about the arbor, is a ball bearing assembly 14 against which the bottom wall of the cup rests. Inside the cup a ball bearing assembly 15 is contained and the shaft 1 passes centrally through this bearing and is thereby held accurately centered relative to the cup for rotation therein. The outer surface of the cup wall is conically tapered in an upward direction, considered as seen in Fig. 1, and fitted to this tapered surface, in close relationship about the cup, are gripping dogs 18. These dogs have inner surfaces engaged against the cup surface and complementally inclined thus when the dogs are actuated downwardly relative to the cup, they will, by reason of the inclination of the engaging surfaces, also be moved outwardly relative to the cup axis. Thus, the effective diameter of the bearing will be increased or decreased with the downward or upward adjustment of the dogs relative to the cup and adapted to pipes of different diameter within certain limits. The outer surfaces of the gripping dogs are transversely toothed to insure the maximum holding effect when they are brought against the pipe walls.

Applied about the spindle shaft and seated against the upper ends of the series of gripping dogs 18 is a washer 20 through which the shaft freely extends. Also applied about the spindle shaft and seated upon the washer 20 is a ball bearing assembly 21 against which a nut 22 that is threaded on the shaft 1 may be tightened. It will be understood that by threading the nut downwardly along the shaft, the bearing 21 and washer 20 will effect a corresponding shifting of the dogs 18 along the cup walls thereby to press the dogs into gripping contact with the pipe walls.

It will be understood also that by this adjustment of dogs, the lower end of shaft 1 will be brought accurately into a center position relative to the pipe axis.

To retain the dogs in assembled relationship about the cup, especially when the device has been released from or has been withdrawn from a pipe, a resilient, spring metal band 23 is applied about the dogs within cross channels 24 that are formed therein. This band is under sufficient tension that the dogs will be held properly assembled, but it will yield as required incident to the expanding action of the bearing by the relative shifting of dogs and cup.

The upper end bearing, for the support of the upper end portion of the shaft 1 comprises an annular wedging member 30, corresponding to the cup of the lower member, and this is applied within the open upper end portion of the pipe with some clearance. Also there is a substantial amount of clearance between the member and shaft. The member 30 has a cylindrical inside surface and a conically inclined outside surface. A succession of gripping dogs 35, like the dogs 18 already described, are applied about the outer surface of the wedging member 30 and these have inclined inside surfaces engaged against the complementally inclined outside surface of the member 30. Also, they have toothed outer surfaces designed to holdingly engage the inside surface of the side walls of the pipe 2. A washer 36 is applied loosely about the shaft, below part 30 and supports all of the dogs 35 thereon. This washer rests upon a ball bearing 40 through which the shaft extends. The bearing 40, in turn, rests upon the top surface of the nut 22. Overlying the member 30, and passing the spindle shaft freely therethrough, is a washer 42 and located about the shaft and seated against the top of this washer is a thrust bearing 43 and a nut 44 is threaded onto the upper end portion of spindle shaft against the bearing 43 and is adapted to be threaded downwardly thereon, thereby to force the wedge member 30 downwardly to expand the dogs 35 into holding contact with the pipe walls.

For the purpose of accurately centering the spindle shaft in the pipe end there is provided four adjusting or set screws 50 that are threaded into and extend radially from the shaft at ninety degree intervals, each set screw being engaged at its outer end with the inner raceway of the bearing 54 contained within the member 30. On each set screw is squared head 55 adapted to be rotated to extend or retract the set screw. Thus it will be understood that by the individual adjustment of these set screws, the spindle shaft may be forced in one way or the other relative to the bearing so that it may be brought accurately to the center of the pipe regardless of any eccentricity of the bearing member. This adjustment of the set screws 50, of course, would be completed before the upper end washer and clamping nut was applied.

Figure 2:
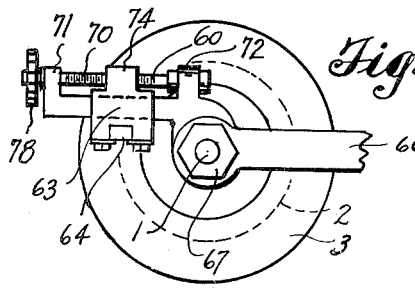
Fig. 2 is a top view of the device as seen in Fig. 1 but at a reduced scale.

Assuming that the spindle shaft has been mounted in the pipe and as illustrated in Fig. 1 and as above described, it will be understood that it may serve then as a support for a tool or as an attachment means for various other uses. In Figs. 1 and 2 I have indicated the spindle shaft as being used as a mounting for a flange smoothing tool. This tool comprises the radial arm 60 that is fitted to a squared end portion 61 of the spindle shaft. Movable along the arm is a carriage 63 mounting a flanging cutter 64. Also mounted on the upper end of the shaft is a handle, or crank 66, held by a nut 67 that is threaded onto the shaft end. The carriage may be automatically advanced along the arm in accordance with rotation of the cutter by any suitable means. In Fig. 2 such a means is shown as comprising a feed screw 70 which is rotatably fixed in bosses 71 and 72 projecting from the arm and is threaded through a lug 74 on the carriage. On the outer end of the feed screw is a ratchet wheel 78 and this may be caused to engage with any fixed ratchet member so that the feed shaft will be rotated a predetermined amount with each rotation of the arm about the spindle shaft.

Assuming that the device is so constructed, it is readily apparent that the spindle shaft may be rigidly and securely mounted in the pipe yet it may be freely rotated. To detach the device it is only necessary to first remove the tool, then unscrew the outer end nut thereby permitting the tapered member 30 to be withdrawn and the gripping dogs to be disengaged. After the upper end has been thus released and removed, the lower nut may likewise be unthreaded and the lower end bearing disengaged. Devices of this character may be made in various sizes and it is to be understood that various details of construction might be altered without detracting from the spirit of the invention.

Having thus described my invention, what I claim as new therein, and desire to secure by Letters Patent, is—

1. In combination, an arbor shaft, and mounting bearings for the said arbor shaft applicable within a tubular member and each comprising a conically tapered casing and gripping dogs arranged about and slidably engaged with the tapered surfaces of the said casings and adjustable therealong to effect movement of the dogs into or from holding contact with walls of a tubular member within which they have been applied, washers movable along the arbor shaft and engaging said dogs for their adjustment, and nuts threaded on the shaft and engaging said washers for the shifting of the dogs for expanding them into holding contact with the walls of the tubular member.

2. A combination as in claim 1 wherein means is provided in one of the bearings for adjusting the arbor in a radial direction therein.

3. A combination as in claim 1 wherein one of the mounting bearings mounts the arbor shaft therein with clearance, and set screws are mounted radially in the arbor and support said bearing, and are radially adjustable.

LAWRENCE A. PAYNE.

REFERENCES CITED

The following references are of record in the file of this patent:

UNITED STATES PATENTS

| Number | Name | Date |
|---|---|---|
| 749,202 | Klay | Jan. 19, 1904 |
| 1,796,208 | Mahoney | Mar. 10, 1931 |
| 2,074,424 | Petersen | Mar. 23, 1937 |

FOREIGN PATENTS

| Number | Country | Date |
|---|---|---|
| 7,409 | Great Britain | 1914 |